(12) United States Patent
Klos et al.

(10) Patent No.: US 11,573,681 B2
(45) Date of Patent: Feb. 7, 2023

(54) METHOD AND DEVICE FOR CONTROLLING A VEHICLE

(71) Applicant: Dr. Ing. h.c. F. Porsche Aktiengesellschaft, Stuttgart (DE)

(72) Inventors: Martin Klos, Schoenaich (DE); Patrick Keuntje, Ludwigsburg (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 549 days.

(21) Appl. No.: 15/716,530

(22) Filed: Sep. 27, 2017

(65) Prior Publication Data

US 2018/0095614 A1  Apr. 5, 2018

(30) Foreign Application Priority Data

Oct. 5, 2016 (DE) ...................... 10 2016 118 888.3

(51) Int. Cl.
| | | |
|---|---|---|
| *G06F 3/0482* | (2013.01) | |
| *B60R 16/037* | (2006.01) | |
| *B60W 50/14* | (2020.01) | |
| *G01C 21/36* | (2006.01) | |

(52) U.S. Cl.
CPC ......... *G06F 3/0482* (2013.01); *B60R 16/037* (2013.01); *B60W 50/14* (2013.01); *G01C 21/3664* (2013.01)

(58) Field of Classification Search
CPC .... G06F 3/0482; G06F 3/048; G06F 9/44505; B60R 16/037; B60R 16/02; B60W 50/14; B60W 50/10; G01C 21/3664
See application file for complete search history.

(56) References Cited

U.S. PATENT DOCUMENTS

| | | | | |
|---|---|---|---|---|
| 9,378,467 | B1* | 6/2016 | Chaiyochlarb | ........ G06N 5/047 |
| 2005/0054381 | A1* | 3/2005 | Lee | .......... G06F 3/011 |
| | | | | 455/557 |
| 2005/0118996 | A1* | 6/2005 | Lee | .......... G06F 3/011 |
| | | | | 455/425 |

(Continued)

FOREIGN PATENT DOCUMENTS

| | | |
|---|---|---|
| CN | 103297491 A | 9/2013 |
| DE | 102013223684 A1 | 5/2015 |

(Continued)

*Primary Examiner* — Peter D Nolan
*Assistant Examiner* — Michael F Whalen
(74) *Attorney, Agent, or Firm* — Leydig, Voit & Mayer, Ltd.

(57) ABSTRACT

A method for making available at least one individualized user function in a vehicle having at least one user interface includes recording data which is transferred to respective functions assigned to the at least one user interface and/or data which is output by the respective functions assigned to the at least one user interface; transferring the recorded data to a server as a function of a state of the vehicle; determining at least one intention of a user of the vehicle on the basis of the data transferred to the server; and dynamically adjusting the vehicle as a function of the at least one intention of the user, by way of at least one user function which is selected and/or generated on the basis of the at least one intention of the user.

20 Claims, 2 Drawing Sheets

(56) References Cited

U.S. PATENT DOCUMENTS

| | | | |
|---|---|---|---|
| 2005/0143138 A1* | 6/2005 | Lee | G06F 3/011 455/566 |
| 2005/0268234 A1* | 12/2005 | Rossi, Jr. | G06F 9/453 715/705 |
| 2008/0114604 A1* | 5/2008 | Wei | G06F 3/038 704/275 |
| 2014/0051458 A1* | 2/2014 | Khosla | H04W 4/029 455/456.1 |
| 2014/0070925 A1* | 3/2014 | Shin | H04L 67/303 340/12.5 |
| 2014/0143404 A1* | 5/2014 | Kennedy | H04L 67/306 709/224 |
| 2014/0337546 A1* | 11/2014 | Kitahama | G06F 3/02 710/73 |
| 2015/0046060 A1 | 2/2015 | Nikovski et al. | |
| 2015/0088422 A1 | 3/2015 | Nikovski et al. | |
| 2015/0222450 A1* | 8/2015 | Ko | H04L 67/303 340/5.82 |
| 2015/0227269 A1* | 8/2015 | Kulas | G06F 3/0482 715/841 |
| 2015/0347905 A1* | 12/2015 | Chen | G06N 5/043 706/12 |
| 2016/0328097 A1* | 11/2016 | Ganin | G06F 3/0482 |
| 2017/0034468 A1* | 2/2017 | Won | G06F 3/0488 |
| 2017/0067750 A1* | 3/2017 | Day | G01C 21/3461 |
| 2019/0001905 A1* | 1/2019 | Lin | B60R 16/037 |
| 2019/0188590 A1* | 6/2019 | Wu | G06F 17/2785 |
| 2019/0210591 A1* | 7/2019 | Low | B60W 30/02 |
| 2019/0274006 A1* | 9/2019 | Khosla | H04W 4/02 |
| 2019/0286480 A1* | 9/2019 | Park | G06F 9/543 |
| 2019/0306137 A1* | 10/2019 | Isaacson | G06Q 30/0641 |
| 2020/0005778 A1* | 1/2020 | Kim | B60R 16/0373 |
| 2020/0249047 A1* | 8/2020 | Balva | G01C 21/3492 |

FOREIGN PATENT DOCUMENTS

| | | |
|---|---|---|
| DE | 102014202234 A1 | 8/2015 |
| DE | 112014003714 T5 | 4/2016 |
| DE | 112014004372 T5 | 6/2016 |
| EP | 2631783 A1 | 8/2013 |
| WO | WO 2015131341 A1 | 9/2015 |

* cited by examiner

METHOD AND DEVICE FOR CONTROLLING A VEHICLE

CROSS REFERENCE TO RELATED APPLICATIONS

This application claims benefit to German Patent Application No. DE 10 2016 118 888.3, filed Oct. 5, 2016, which is hereby incorporated by reference herein.

FIELD

The present invention relates to a method for making available at least one individualized user function in a vehicle and to a control system for a vehicle.

BACKGROUND

Infotainment systems for vehicles are generally configured statically, i.e. are equipped with a functional scope which is predefined at a time of delivery. This functional scope can be individualized only to a limited extent, i.e. insofar as is provided by respective functions, for example by selecting various background motifs.

Application cases of respective functions are defined in a design phase of the functions and generally do not take into account either a use behavior of a user or application cases which may occur in the future as a result of additional new functions.

In order to expand the functional scope of a vehicle, system software can be subjected to an update or additional applications can be downloaded. Updates of the system software are generally not individualized and correspondingly do not take into account a use behavior of the user. Additional applications which are made available, for example, by third party providers and are loaded into a respective vehicle via a data interface are self-contained enclosed application cases and are frequently not integrated seamlessly into an overall system of the vehicle. Correspondingly, such additional applications are limited in their functional scope and are not suitable for implementing or operating individual application cases.

SUMMARY

In an embodiment, the present invention provides a method for making available at least one individualized user function in a vehicle having at least one user interface. The method includes recording data which is transferred to respective functions assigned to the at least one user interface and/or data which is output by the respective functions assigned to the at least one user interface; transferring the recorded data to a server as a function of a state of the vehicle; determining at least one intention of a user of the vehicle on the basis of the data transferred to the server; and dynamically adjusting the vehicle as a function of the at least one intention of the user, by way of at least one user function which is selected and/or generated on the basis of the at least one intention of the user.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
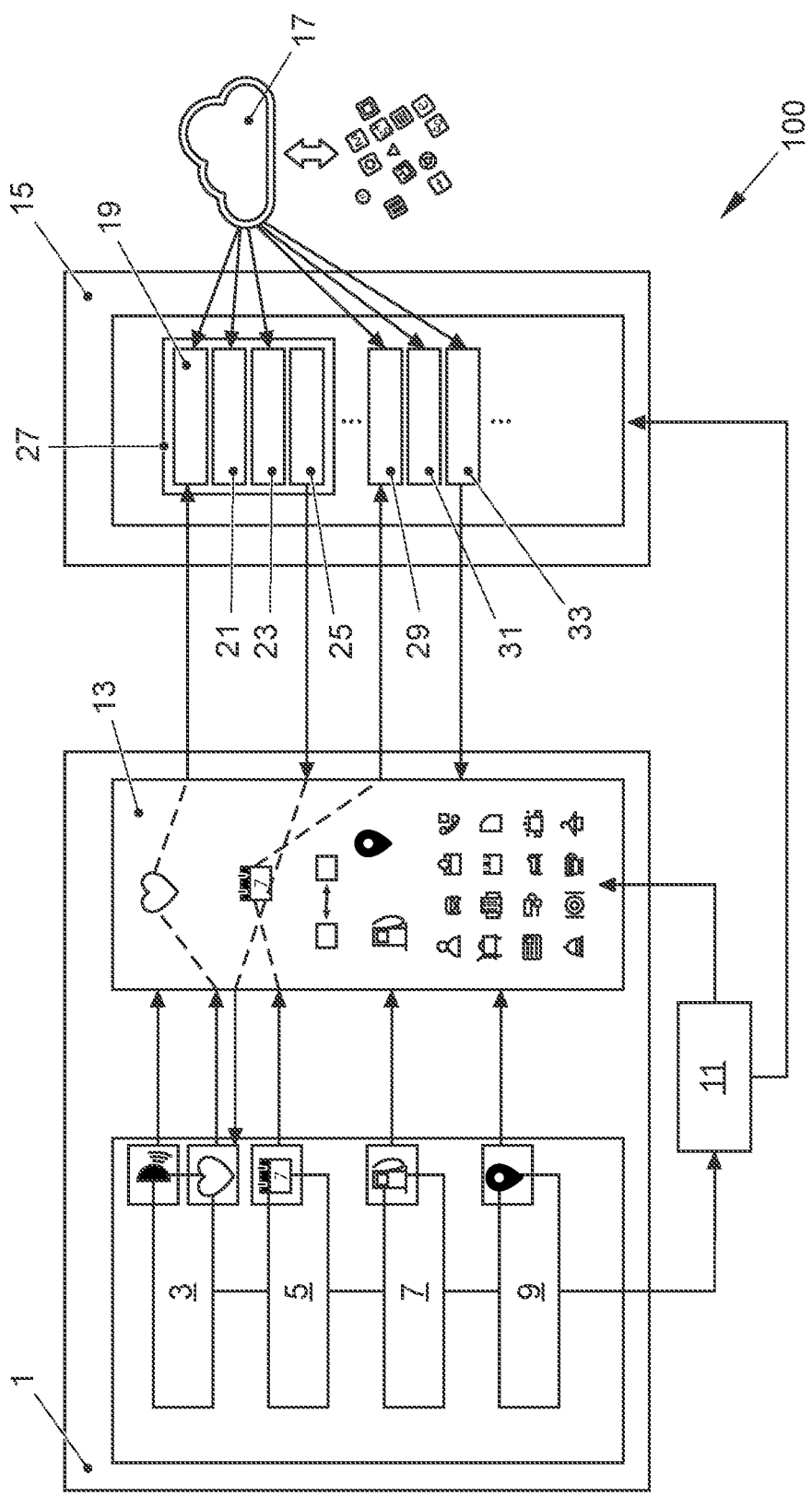
FIG. 1 shows a schematic illustration of a possible refinement of a control system according to an embodiment of the invention.

An aspect of the proposed invention is to provide a way of dynamically expanding a functional scope of a vehicle with functions which correspond as well as possible to an intention of a user of the vehicle.

Embodiments of the invention provide methods for making available at least one individualized user function in a vehicle, in which data which is output by respective functions assigned to at least one user interface of the vehicle and/or data which is transferred to the respective functions assigned to the at least one user interface is recorded and transferred to a server as a function of a state of the vehicle, and in which at least one intention of a user of the vehicle is determined on the basis of the data transferred to the server, and in which the vehicle is adjusted dynamically as a function of the at least one intention of the user, by means of at least one user function which is selected and/or generated on the basis of the at least one intention of the user.

The proposed methods serve, in particular, for dynamically expanding a functional scope of a vehicle taking into account at least one intention, i.e. an objective or a motivation of a user. For this purpose, methods of the present invention can evaluate data relating to functions of the vehicle, i.e. data which has been output by respective applications or functions and/or data which has been transmitted to the functions, such as for example interaction points of a user with the at least one user interface, in order to detect an intention of the user. On the basis of the data which is output by the respective functions and/or the data which is transmitted to the functions at least one pattern can be determined at respective interaction points of a user with a respective vehicle, by means of which pattern a current intention or a plurality of current intentions of the user can be inferred.

An intention of a user is to be understood within the context of the present invention as an objective toward which the user acts through interaction with respective functions of the vehicle. An intention corresponds to a desire or an objective of the user during an interaction with a vehicle. For example, the user can have the intention of going for a drive in nice weather with a convertible and firstly obtains information about the weather in various accessible geographic regions using a "weather service" function. Then, by means of a "route planning" function the user selects a route which has a particularly beautiful panorama. By using the presented method there is provision, for example, that the intention, i.e. in this case the drive in nice weather, is detected on the basis of a pattern at interaction points of the user with the vehicle or respective functions of the vehicle and the intention of "going for a drive in nice weather" is inferred correspondingly from the combination of requests to the "weather service" function and the "route planning" function. On the basis of the "going for a drive in nice weather" intention, an individualized user function, i.e. one which is specifically matched to the user and for example facilitates operator control can be selected and/or made available.

A user function is to be understood within the context of the present invention as a function which is generated or selected as a function of an intention of a user. A user function can be selected according to the presented method, i.e. for example from a multiplicity of functions stored in a database, on the basis of a selection criterion such as, for example, an intention. Furthermore, a user function can be generated according to the proposed method. In order to generate a user function, a function which is already present can be expanded or modified and/or combined with other functions to form a functional unit. Of course, a user function can also be completely newly generated independently of functions which are already present.

In order to detect a respective intention of a respective user, there is provision, in particular, that interaction points of the user with at least one function of a vehicle, i.e. for example an input of the user via a user interface of the vehicle, are evaluated. On the basis of a sequence of respective interaction points and/or on the basis of a respective time of respective interaction points, in particular in relation to the occurrence of a triggering event, i.e. a trigger such as, for example, a changed technical state of the vehicle, it is possible to detect patterns which with a certain probability indicate a respective intention of the user or are assigned to a respective intention of the user. Such patterns can be, for example, input steps which are carried out frequently in parallel or sequentially.

An interaction point is to be understood within the context of the present invention as being an input of at least one control instruction for control of a function by a user by means of a user interface of a vehicle. In this case, the user interface can, of course, also be connected to the vehicle, as is typical, for example, in the case of use of mobile computing units. There is provision, in particular, that an intention of a user is determined or detected on the basis of a plurality of interaction points which are determined over a specific period of time.

In order to assist the user in implementing his intention there is furthermore provision that as soon as a respective intention is known or has been detected, the vehicle is configured to make available a functional scope which is as well suited as possible for implementing the intention. For this purpose there is provision that respective user functions which are suitable or required for implementing the intention, such as for example route guidance which is updated as a function of the current weather, are transferred to the vehicle and set there.

In order to detect an intention of a respective user, it is possible to use interaction points of the user with the vehicle which are repeated over a long period of time. It is therefore possible, for example in the case of repeated selection of refueling stations of a specific company by the user by means of a route guiding function to infer that the user has the intention of preferably driving to refueling stations of this company when necessary.

In particular, according to the presented method there is provision that respectively stored data, i.e. the data which is output by functions and/or the data which is transferred to the respective functions assigned to the at least one user interface, is transmitted to a server provided according to an embodiment of the invention as a function of a state of the vehicle, i.e. an occurrence of a triggering event such as, for example, a low fuel filling level.

In order to detect an intention of a user in the case of a changed state of a respective vehicle, there can be provision that data which is used to detect the intention such as, for example, recorded interaction points, is transmitted in an updated fashion or again to the sever provided according to an embodiment of the invention as a function of a trigger which indicates, in particular, a changed state of the vehicle such as, for example, a critical fuel filling level.

In order to make available a respective user function which is suitable for implementing a respective intention, the user function which is suitable for implementation can be selected from a multiplicity of predefined functions, for example from a database, or can be newly generated as a user function which is specifically suitable for implementing the respective intention. A user function which is specifically suitable for implementing the respective intention can be generated, for example, by generating a new user function on the basis of an existing primitive function such as, for example, a route guidance, in that the primitive function is supplemented with a further function such as, for example, a weather service, with the result that newly individualized application cases are integrated into a system of the vehicle, or a newly individualized functional scope is integrated into the system of the vehicle.

In order to detect an intention on the basis of data which is collected by a respective vehicle and to select and/or generate respective user functions, there is provision according to an embodiment of the invention that the data which is collected by the vehicle is transmitted to a server which analyzes the data for patterns and detects, for example, user inputs which occur frequently or take place as a function of an event, i.e. a trigger, such as for example a changed vehicle state, and passes on corresponding patterns to an intention application. A trigger can be, for example, a critical fuel filling level, calling of a specific function, outputting of a fault message as well as any other technical vehicle state.

In a further possible refinement of the presented method there is provision that the vehicle is adjusted in accordance with the at least one intention of the user by means of an intention application which has a communicative connection both to the at least one user interface or a data memory of the vehicle and to the server and, if appropriate, a database with functions.

In order to adjust a respective vehicle according to a respective detected intention of a user, in one refinement of the presented method there is provision that an intention application or an "intention service" is used, to which respective patterns, detected by the server on the basis of data transferred to the server by the vehicle, are transferred by the server in the interaction of the user with the vehicle. On the basis of the data which is transferred by the server, the intention application determines an intention of the user and requests at least one user function which is suitable for making available to the vehicle a functional scope which matches the intention and/or implements the intention. For this purpose, the intention application can load various functions or request them from the server or a database which comprises a multiplicity of functions.

The intention application serves, in particular, as an interface between the vehicle which is provided according to an embodiment the invention and a database which makes available additional functions. The intention application receives, by means of the server provided according to an embodiment of the invention, information about detected patterns in a use behavior of a respective user and determines the intentions of said user. There is provision, in particular, that the intention application determines an intention of the user on the basis of data or patterns transferred by the server. In order to determine the intention, the intention application can integrate, for example, states of various functions of the vehicle and currently performed interactions of the user with the vehicle.

It is conceivable that the intention application requests a user function which matches a current intention of the user, as a function of a triggering event, i.e. what is referred to as a trigger, from the database. Such a trigger can be, for example, a call, an approaching deadline, a mark on a data object such as, for example, a "like" or a changed state of the vehicle.

In a further possible refinement of the presented method there is provision that the intention application is executed on a computing unit which is included in the vehicle or on the server or on a further computing unit which is external to the vehicle.

The intention application is advantageously executed on a controller which is included in a respective vehicle. Of course, it is also conceivable that the intention application is executed on any other technically suitable controller or on a corresponding computing unit which is connected to the vehicle, for example via a wireless interface.

In a further possible refinement of the presented method there is provision that the at least one intention of the user is determined by virtue of the fact that a series of inputs which are made by the user of the vehicle is determined in the data transferred to the server and is compared with a predefined list of sequences of inputs which are assigned to respective intentions.

In order to detect a respective intention of a user, respective interaction points can be evaluated and used, for example, with an assignment table which assigns various sequences at interaction points to respective intentions, in order to detect an intention of the user. Such sequences can comprise, for example, a number of functions which are called and/or used in a chronologically successive manner, in parallel or alternately by the user.

In a further possible refinement of the presented method there is provision that the at least one intention of the user is determined by means of a machine learner which assigns a respective sequence of inputs made by the user of the vehicle, which sequence has been determined from the data transferred to the server, to a predefined intention class.

In order to assign a respective intention of a user without a fixedly predefined assignment schema to respective interaction points of the user with a vehicle and to detect the intention correspondingly, machine learners are suitable which are trained, for example, to a training data set and subsequently assign respective transferred data automatically to an intention class or to a plurality of intention classes, i.e. to logic classes which correspond to various intentions. In this case, machine readers, in particular artificial neural networks, support vector machines and k-nearest neighbor methods are suitable as machine learners.

In a further possible refinement of the presented method there is provision that the at least one user function is generated on the basis of a primitive function which is selected as a function of the intention of the user, combined with at least one further function and transmitted to the vehicle in order to configure the vehicle in accordance with the intention of the user.

In order to generate a user function which has a functional scope which is expanded compared to a primitive function, the primitive function can be logically linked to an additional function or application to form a function group and subsequently transmitted as an individualized user function to the vehicle.

In order to generate a user function, the intention application determines an intention of the user which is determined on the basis of interactions of a user with a vehicle, and said intention application determines a functional scope which corresponds to the intention of the user, i.e. which is required to operate or to implement the intention of the user. On the basis of the determined and required functional scope, a primitive function is selected which covers the functional scope as well as possible. If the functional scope is not completely covered by the primitive function, a further function is determined which covers the missing functional scope as well as possible, and so on. All the functions which are provided for covering a functional scope which corresponds to an intention are combined to form an individualized user function and transmitted to the vehicle, with the result that the vehicle can make available to the user the functional scope which corresponds to his intention. In this context, the various functions can already be linked logically with one another to form a functional unit before the transmission to the vehicle. In one functional unit, an output of a first function such as, for example, a primitive function, is fed to a further function or application. Correspondingly, owing to the use of a plurality of functions which interact with one another, one functional unit generates a synergy effect in the form of a functional scope which is increased compared to respective individual functions, with an operating capability which is generally simplified. A sequence of supplying the various functions with data of the primitive function or of respective upstream functions can occur, for example, as a function of the respective portion which they form of the coverage of the functional scope which is required to implement or satisfy the intention.

In a further possible refinement of the presented method there is provision that the at least one function is selected and/or generated in such a way that the at least one intention of the user is satisfied as well as possible.

In order to supplement a respective primitive function or to select a respective function to be transmitted to a respective vehicle from a multiplicity of functions, there is provision that the respective function is selected in such a way that a respective determined intention of a user is satisfied as well as possible.

In a further possible refinement of the presented method there is provision that the at least one user interface is a user interface from the following list of user interfaces: media control device, communication control device, vehicle control device or navigation control device.

A user interface can be, for example, a sub-menu structure for controlling vehicle functions or for controlling a navigation device.

In a further possible refinement of the presented method there is provision that data from a multiplicity of user interfaces is transferred to the server, and the server evaluates the data of the multiplicity of user interfaces in a predefined prioritization in order to determine the at least one intention of the user.

In order to determine a respective intention of a user, various user interfaces can be considered with different weighting. In order, for example, to take into account interactions of a user with a central HMI (Human-Machine Interface) controller with a higher weighting, when determining the intention of the user, than interactions of the user with a steering column switch of the vehicle, a higher priority can be allocated to the central HMI controller, which is to be operated, for example, by means of a touch-sensitive screen, than to the steering column switch, with the result that in the case of parallel or sequential operation of the steering column switch and of the central HMI controller, the intention of the user is determined predominantly on the basis of the interaction with the central HMI controller, and for example the interaction with the steering column switch is evaluated only if the interaction with the central HMI controller has not lead to a clear result, i.e. has led to an assignment of respective interaction points of the user with the HMI controller to an intention with a probability which is below a predefined threshold value.

As soon as an intention of a respective user is known, functions which are suitable for satisfying the user's intention can be determined and transmitted as a user function to a respective vehicle. Such user functions can, as new application cases, be proposed to the user as functions to be used in the future or can be offered in the form of dynamically generated new HMI elements in an infotainment system.

In a further possible refinement of the presented method there is provision that the at least one user function is stored in a database and made available for transfer to other vehicles.

As soon as an individualized user function has been generated, it can be stored on a database for other users of other vehicles in which a similar or identical intention has been detected to that on which the individualized user function is based, and can be made available when required.

In addition, the present invention relates to a control system for a vehicle having a controller, wherein the controller is configured to record data which is output by respective functions assigned to at least one user interface of the vehicle and/or data which is transferred to the respective functions assigned to the at least one user interface, and to transfer said data to a server as a function of a predefined state of the vehicle, wherein the server is configured to determine, on the basis of the data transferred to the server, at least one pattern in interaction points of a user of the vehicle with the vehicle and to transmit the at least one pattern to an intention application, and wherein the intention application is configured to determine at least one intention of the user on the basis of the at least one pattern, and to request at least one user function which is selected and/or generated on the basis of the at least one intention of the user from a database, and wherein the controller is also configured to adjust the vehicle dynamically as a function of the at least one intention of the user, by means of the user function which is requested by the intention application. The control system which is presented serves, in particular, to carry out the method which is presented.

FIG. 1 illustrates a control system 100 in which, for each application or function assigned to a user interface 3, 5, 7 and 9, in a vehicle 1, respective data which is transferred to the user interfaces 3, 5, 7 and 9 and data which is requested by the user interfaces 3, 5, 7 and 9 is transmitted to a server 11.

Depending on a state of the vehicle, i.e., for example if a user makes an input via one of the user interfaces 3, 5, 7 or 9 and as a result configures a computing unit of the vehicle or a fuel filling level reaches a critical value, all the interpolation points of the user with the vehicle, i.e. all the inputs at user interfaces 3, 5, 7 and 9 are recorded and transferred to the server 11.

The server 11 evaluates the data transferred to the server 11 from the vehicle 1 in that the data is examined for patterns in the interaction points, i.e. for example frequently recurring input sequences or frequently executed parallel inputs.

It is therefore possible, for example, to establish that the user frequently requests route guidance to a refueling point of a specific company if the fuel filling level is low.

As soon as at least one pattern has been detected in the respective interaction points, an intention application 13, which is executed on a controller of the vehicle 1, is updated by means of an update, i.e. an updating step which comprises the at least one detected pattern. The update enables the intention application 13 to infer, on the basis of the at least one pattern, an intention of the user, specifically, for example, preferably to drive to refueling stations of the specific company. Correspondingly the update permits the intention application 13 to determine, as a function of a changed state of the vehicle, specifically the critical fuel filling level, an intention of the user which corresponds to the state of the vehicle, specifically preferred travel to refueling stations of the specific company. On the basis of the intention of the user, the intention application 13 can determine a function which corresponds as well as possible to the intention of the user, and can request said function from a data source such as, for example, a database 15.

In the present case, the intention application 13 uses data of the user interfaces 3, 5, 7 and 9 in order to infer the intention of the user. In this context, user instructions which are made available, for example, by means of the user interface 3 through voice input by the user are evaluated for the purpose of marking, i.e. for "liking" an artist.

Furthermore, the intention application 13 evaluates information about an imminent deadline which is made available by the user interface 5, said deadline having been read out, for example, from a cell phone of the user and having been created there by the user.

In addition, enquiries of the user regarding the technical state of the vehicle 1, in particular regarding the fuel filling level, which have been made by means of the user interface 7, as well as locations of interest which have been interrogated by the user by means of the user interface 9 are evaluated by the intention application 13.

In order to make available complex functions which take into account, for example, new functions which additionally become available during a life cycle of the vehicle 1, updated functions of the database 15, which is updated by means of a cloud server 17 can be requested by the intention application 13. It is therefore possible, for example, for a user to "like" an artist "x" via the user interface 3, i.e. to mark, and, for example, positively assess said artist on an Internet portal. A corresponding interaction point is transmitted to the server which detects "liking" as a direct indication of a pattern and transfers the pattern "user favors artist "x"" to the intention application 13. The intention application 13 detects the intention of the user to favor works by the artist "x" and then requests additional works by the artist "x" or a function for offering works by the artist "x" from the database 15.

By recording or storing a time profile of interaction points of the user with the vehicle 1 it is also possible to identify functions which are frequently used sequentially or in parallel or alternately with regard to one another. On the basis of patterns which provide information as to which functions are used sequentially or in parallel or alternately with regard to one another, the intention application 13 can request a correspondingly individualized function from the database 15 which links together a plurality of functions in order to correspond as well as possible to the intention of the user. For example, a compilation of works by the artist "x" together with an option to purchase concert tickets can be output in reaction to the "liking" of the artist "x" by the user.

In this context, there can be a corresponding service chain composed of a plurality of individual services.

It is therefore possible, for example, for the "liking" of the artist "x" to cause imminent concerts to be requested from a service "A". The information which is made available by the service "A" is transferred to the service "B" for reserving concert tickets, with the result that a combined user case is produced. Through acquired knowledge of the server 11 about the interaction of service "A" and service "B" a correspondingly combined function group 27 is stored on the database 15 for transmission to the vehicle 1 or to further vehicles.

Alternatively the server 11 can also request directly a function which matches a respective detected pattern such as, for example, a music album, from the database 15.

Individual functions 19, 21, 23, 25 can be combined to form a combined function group 27 by the database 15. On the basis of the combined function group 27, new application cases can be proposed proactively to the user in the future, for example during updating of one of the functions 19, 21, 23 or 25 or can be offered in the form of new HMI elements by means of the user interface 3. In this context, the new application cases can be generated or offered dynamically, for example as a function of a current vehicle status or vehicle state.

Of course, a request for an individual function which is correspondingly not assigned to any function group can also be made by the intention application 13. The database 15 downloads, at the request of the intention application 13, one or more corresponding functions 29, 31 and 33 from the cloud server 17 and transfers them to the vehicle 1.

Figure 2:
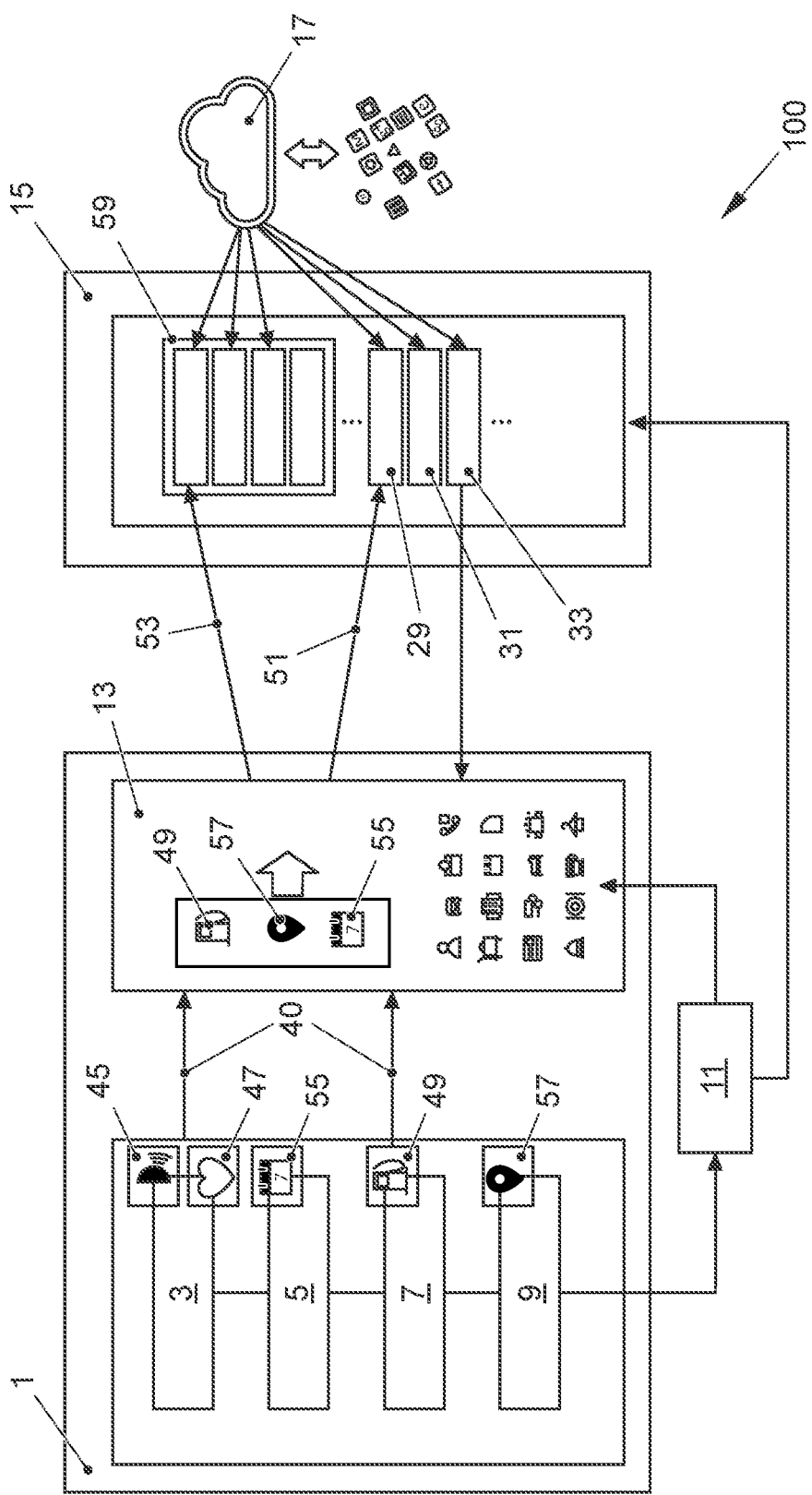
FIG. 2 shows a further schematic illustration of the control system from FIG. 1.

FIG. 2 shows the control system 100 in which the intention application 13 evaluates data made available by the server 11 and determines corresponding intentions of the user as a function of a trigger signal 40 which is activated in a predefined state of the vehicle 1 such as, for example, in the case of the detection of a voice input for transferring a mark on an Internet platform, i.e. a "like", as indicated by symbols 45 and 47, in conjunction with, for example, a low fuel filling level, as indicated by symbol 49.

In a first case, the intention application 13 determines on the basis of the "like" an intention of the user to request further information on which the "like" is based. Correspondingly, the intention application 13 requests further information from the database 15, as indicated by arrow 51.

In a second case, the intention application determines, on the basis of the low fuel filling level and a deadline stored in a deadline calendar of the user, as indicated by symbol 55, which takes place at a remote area, as indicated by symbol 57, the intention of the user to find a refueling station which is located on the way to the area at which the deadline takes place. Correspondingly, the intention application 13 requests a function from the database 15, as indicated by arrow 53, which finds a refueling station on the way to the area of the deadline. The database 15 correspondingly makes available a functional unit 59 which comprises a function for finding a refueling station and function for navigating to the area of the deadline as well as, if appropriate, further functions, with the result that by means of the functional unit 59 a synergy effect of respective functions included in the functional unit 59 is provided, and the function for navigating to the area of the deadline is supplied with an output of the function for finding the refueling station and, if appropriate, further functions included in the functional unit 59. Correspondingly, the functional unit 59 makes available route guidance to a refueling station which is located on the way to the area of the deadline. The functional unit 59 is transmitted to the vehicle 1 and used there to set a navigation system of the vehicle 1.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for adding at least one individualized user function to a software functional scope of an infotainment system in a vehicle having at least one user interface, the at least one individualized user function being outside the software functional scope prior to being added to the infotainment system, the method comprising:
   recording data which is input or output to respective functions assigned to the at least one user interface;
   outputting the recorded data to a server in response to an occurrence of a state of the vehicle;
   determining at least one intention of a user of the vehicle on the basis of the data output to the server;
   selecting or generating the at least one individualized user function based upon the at least one intention of the user;
   receiving, by the infotainment system from the server or database external to the infotainment system, new software corresponding to the selected or generated at least one individualized user function; and
   reconfiguring the software functional scope of the infotainment system of the vehicle according to the at least one intention of the user by loading the new software in a data memory of the infotainment system thereby reconfiguring the infotainment system to enable performance of the at least one individualized user function.

2. The method as claimed in claim 1, wherein a target functional scope is determined in accordance with the at least one intention of the user by way of an intention application which has a communicative connection both to the at least one user interface and to the server, wherein the at least one individualized user function is selected or generated to match the target functional scope.

3. The method as claimed in claim 2, in which the intention application is executed on a computer which is included in the vehicle or on the server.

4. The method as claimed in claim 1, wherein the at least one intention of the user is determined by virtue of a fact that a series of inputs which are made by the user of the vehicle is determined in the data output to the server and is compared with a predefined list of sequences of inputs which are assigned to respective intentions.

5. The method as claimed in claim 1, wherein the at least one intention of the user is determined by way of a machine learner which assigns a respective sequence of inputs made by the user of the vehicle, the sequence having been determined from the data output to the server, to a predefined intention class.

6. The method as claimed in claim 5, wherein the machine learner is at least one of a neural network, a support vector machine, and a k-nearest neighbor method.

7. The method as claimed in claim 1,
wherein the software functional scope of the infotainment system comprises a plurality of user functions, wherein the plurality of user functions does not comprises the individualized user function prior to the new software being loaded in the data memory,
wherein the at least one individualized user function is generated by:
determining a target functional scope of the at least one individualized user function based on the intention of the user,
selecting a primitive function that corresponds to a portion of the target functional scope, the primitive function comprises a smaller functional scope as compared to any one of the plurality of user functions,
selecting at least one further function that covers a remaining portion of the target functional scope, and;
logically linking together the primitive function with the at least one further function to generate a new combined function unit configured to provide the at least one individualized user function, and
wherein reconfiguring the infotainment system comprises updating a software application of the infotainment system to make available the at least one individualized user function for selection by a user.

8. The method as claimed in claim 1, wherein the recorded data that is output to the server is correlated with the respective state of the vehicle.

9. The method as claimed in claim 1, wherein the at least one user function is selected and/or generated in such a way that the at least one intention of the user is satisfied.

10. The method as claimed in claim 1, in which the at least one user interface is a user interface from the following list of user interfaces: a media control device, a communication control device, a vehicle control device, or a navigation control device.

11. The method as claimed claim 1, wherein data from a multiplicity of user interfaces is output to the server, and wherein the server evaluates the data of the multiplicity of user interfaces in a predefined prioritization in order to determine the at least one intention of the user.

12. The method as claimed in claim 1, wherein the at least one individualized user function is stored in the database and made available for transfer to other vehicles.

13. The method as claimed in claim 1, wherein the at least one individualized user function is a software application that was not previously existing for execution by the infotainment system.

14. The method as claimed in claim 1, wherein the software functional scope of the infotainment system of the vehicle comprises human-machine-interface application elements associated with the infotainment system and the at least one individualized user function is a new human-machine interface application element associated with the infotainment system which was not contained in the software functional scope of the infotainment system prior to the new software being loaded in the data memory of the infotainment system.

15. The method as claimed in claim 14, wherein the at least one intention of the user is determined by way of a machine learner which assigns a respective sequence of inputs made by the user of the vehicle, the sequence having been determined from the data output to the server, to a predefined intention class, and wherein the at least one individualized user function is generated by combining a primitive human-machine-interface function selected based upon the intention of the user, with at least one further human-machine-interface function.

16. The method as claimed in claim 1, the method comprising the generating of the at least one individualized user function based upon the at least one intention of the user, which comprises determining a target function scope corresponding to the at least one intention of the user, and selecting a primitive function that covers the target function scope corresponding to the at least one intention of the user.

17. The method as claimed in claim 16, wherein the at least one individualized user function is formed from the primitive function.

18. The method as claimed in claim 16, further comprising:
in response to determining that the primitive function does not completely cover the target function scope corresponding to the at least one intention of the user, determining one or more further functions that cover the uncovered part of the target function scope corresponding to the at least one intention of the user.

19. The method as claimed in claim 18, the method further comprising combining the primitive function and the one or more further functions to form the at least one individualized user function.

20. A control system for a vehicle, the control system comprising:
a controller, wherein the controller is configured to:
record data which is input or output by respective functions assigned to at least one user interface of an infotainment system of the vehicle, and
output the recorded data to a server in response to an occurrence of a predefined state of the vehicle,
wherein the server is configured to determine, on the basis of the data output to the server, at least one pattern in interaction points of a user of the vehicle with the vehicle and to transmit the at least one pattern to an intention application, and
wherein the intention application is configured to determine at least one intention of the user on the basis of the at least one pattern, and to request at least one individualized user function which is selected or generated on the basis of the at least one intention of the user from a database or the server, and
wherein the controller is also configured to: receive from the server or the database new software corresponding to the selected or generated at least one individualized user function; and to add the at least one user function to a software functional scope of the infotainment system by loading the new software in a data memory of the infotainment system thereby reconfiguring the infotainment system to enable performance of the at least one individualized user function by the infotainment system, and wherein the at least one individualized user function is outside the software functional scope of the infotainment system prior to the new software being loaded in the data memory.

\* \* \* \* \*